(12) United States Patent
Kokayeff et al.

(10) Patent No.: US 9,108,122 B2
(45) Date of Patent: Aug. 18, 2015

(54) PROCESS AND APPARATUS FOR PRODUCING DIESEL

(71) Applicant: UOP LLC, Des Plaines, IL (US)

(72) Inventors: Peter Kokayeff, Naperville, IL (US); Clayton C. Sadler, Arlington Heights, IL (US); Vasant P. Thakkar, Elk Grove Village, IL (US)

(73) Assignee: UOP LLC, Des Plaines, IL (US)

(*) Notice: Subject to any disclaimer, the term of this patent is extended or adjusted under 35 U.S.C. 154(b) by 111 days.

(21) Appl. No.: 13/929,958

(22) Filed: Jun. 28, 2013

(65) Prior Publication Data

US 2015/0004072 A1 Jan. 1, 2015

(51) Int. Cl.
*B01J 8/00* (2006.01)
*C10G 65/12* (2006.01)
*B01D 3/00* (2006.01)

(52) U.S. Cl.
CPC . *B01D 3/009* (2013.01); *B01J 8/00* (2013.01); *C10G 65/12* (2013.01)

(58) Field of Classification Search
CPC .................................. B01J 8/00; C10G 65/12
USPC .............................. 422/187; 585/250; 208/89
See application file for complete search history.

(56) References Cited

U.S. PATENT DOCUMENTS

| 3,445,378 | A | * | 5/1969 | De Graff | 208/104 |
| 5,403,469 | A | | 4/1995 | Vauk et al. | |
| 6,638,418 | B1 | * | 10/2003 | Kalnes et al. | 208/89 |
| 7,419,582 | B1 | | 9/2008 | Hoehn et al. | |

OTHER PUBLICATIONS

HP Innovations, "New Process Raises Yield of Low-Sulfur Diesel", Hydrocarbon Processing, Mar. 2005, p. 27.
Kraus, "Beyond ULSD: Technology Enhancements to Improve Distillate Product Quality", NPRA Annual Meeting Technical Papers, v 1, p. 25-46, 2009, NPRA Annual Meeting, Mar. 22, 2009.
Lee, "Refiners Have Many Options to Convert High-Aromatic Streams Into ULSD", Oil & Gas Journal, v 104, n 19, p. 48-52, 54-55, May 15, 2006.
U.S. Appl. No. 13/929,949, filed Jun. 28, 2013.

* cited by examiner

*Primary Examiner* — Walter D Griffin
*Assistant Examiner* — Huy-Tram Nguyen
(74) *Attorney, Agent, or Firm* — James C. Paschall

(57) ABSTRACT

A process and apparatus is disclosed for pretreating a hydrocarbon stream in a hydrotreating reactor and separating the diesel materials from the pretreated effluent before the heavier liquid materials are fed to a hydrocracking unit. Thus diesel materials are preserved but recovered along with the hydrocracked effluent. A recovered diesel stream can be sent to a hydrotreating unit to improve its cetane rating.

19 Claims, 1 Drawing Sheet

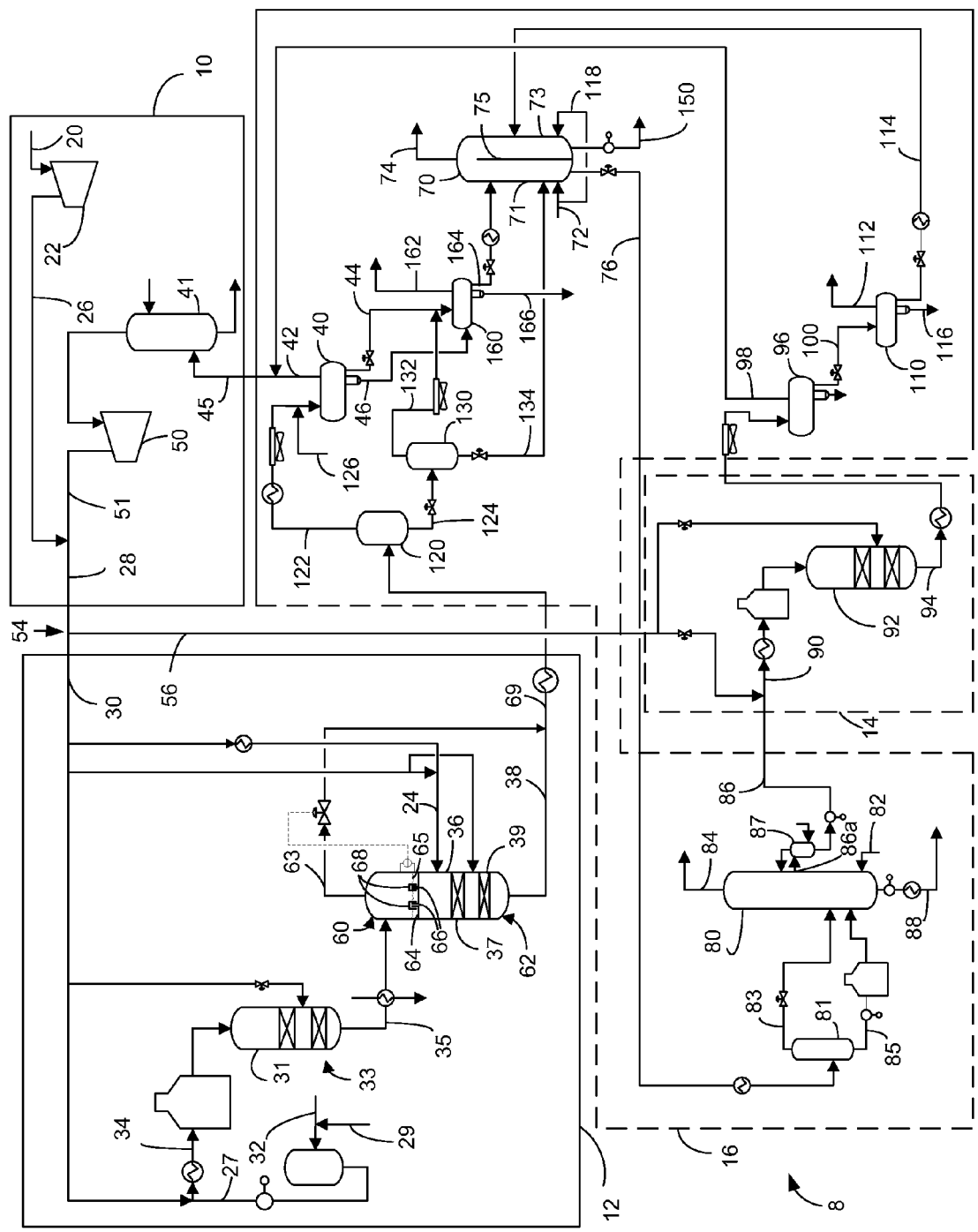

PROCESS AND APPARATUS FOR PRODUCING DIESEL

FIELD OF THE INVENTION

The field of the invention is the production of diesel by hydrocracking

BACKGROUND OF THE INVENTION

Hydrocracking refers to a process in which hydrocarbons crack in the presence of hydrogen and catalyst to lower molecular weight hydrocarbons. Depending on the desired output, the hydrocracking zone may contain one or more beds of the same or different catalyst. Hydrocracking is a process used to crack hydrocarbon feeds such as vacuum gas oil (VGO) to diesel including kerosene and gasoline motor fuels.

Mild hydrocracking is generally used upstream of a fluid catalytic cracking (FCC) or other process unit to improve the quality of an unconverted oil that can be fed to the downstream FCC unit, while converting part of the feed to lighter products such as diesel. As world demand for diesel motor fuel is growing relative to gasoline motor fuel, mild hydrocracking is being considered for biasing the product slate in favor of diesel at the expense of gasoline. Mild hydrocracking may be operated at a lower severity than partial or full conversion hydrocracking to balance production of diesel with the FCC unit, which primarily is used to make naphtha. Partial or full conversion hydrocracking is used to produce diesel with less yield of the unconverted oil which can be fed to a downstream unit.

Due to environmental concerns and newly enacted rules and regulations, saleable diesel must meet lower and lower limits on contaminants, such as sulfur and nitrogen. New regulations require essentially complete removal of sulfur from diesel. For example, the ultra low sulfur diesel (ULSD) requirement is typically less than about 10 wppm sulfur.

The cetane rating of diesel can be improved by saturating aromatic rings. Catalysts for saturating aromatic rings are typically noble metal catalysts. The cloud point and pour point of diesel can be improved by isomerizing paraffins to increase the degree of branched alkyl groups on the paraffins. Isomerization catalysts can also be noble metal catalyst. Noble metal catalysts are typically poisoned by sulfur species.

There is a continuing need, therefore, for improved methods of producing more diesel from hydrocarbon feedstocks than gasoline. Such methods must ensure that the diesel product meets increasingly stringent product requirements.

BRIEF SUMMARY OF THE INVENTION

Mild hydrocracking typically utilizes both hydrotreating catalyst to remove organonitrogen and organosulfur species and hydrocracking catalyst to effect conversion to smaller molecules. At typical mild hydrocracking conditions the distillate product frequently does not meet an ULSD specification, which is less than 10 wppm sulfur, and is also typically of lower cetane, between 40 and 45. To produce ULSD, the mild hydrocracked distillate product, which may contain up to about 200 wppm sulfur, is recovered in a fractionation section and processed in a separate, but integrated, distillate hydrotreater.

Frequently, additional distillate feedstocks are also introduced into the distillate hydrotreater to produce additional ULSD product. While such a process schemes produce ULSD from mild hydrocracked distillate, it does not typically produce diesel with high cetane. It would be advantageous to produce high cetane diesel by replacing the hydrotreating catalyst in the distillate hydrotreater with a noble metal saturation catalyst to effect saturation of aromatics and increase the cetane number. Unfortunately, the presence of co-feeds to the distillate hydrotreater precludes that option as the co-feeds typically have high concentrations of sulfur such as greater than 1000 wppm, typically at least 1 wt %, sulfur which would poison the noble metal catalyst.

On the other hand, adding distillate co-feeds to the pre-treat hydrotreating reactor upstream of the mild hydrocracking unit, the distillate co-feed would undergo significant desulfurization to the point where they would be suitable as feeds to the distillate hydrotreater charged with noble metal catalyst. This approach, while effective, would also reduce the yield of distillate since the distillate co-feeds would then pass from the pre-treat hydrotreater to the hydrocracking reactor and undergo undesired cracking to naphtha and lighter products.

In order to avoid routing the distillate from the pre-treat hydrotreating reactor to the hydrocracking reactor with consequent loss of distillate yield, pretreated hydrotreated effluent is separated into a gaseous stream comprising distillate and lighter materials and a liquid stream. The separator may be located at the top of a hydrocracking reactor. The gaseous stream, comprising distillate, is taken overhead in the separator and bypasses the hydrocracking reactor which then operates to crack only the desired heavy liquid stream to additional distillate range products. The hydrocracked effluent and the hydrotreated gaseous stream may be mixed for further processing such as hydrotreating the distillate stream to increase its cetane and/or reduce its sulfur and nitrogen content.

An embodiment of the invention is a process for producing diesel from a hydrocarbon stream which may comprise feeding a hydrocarbon stream to a hydrotreating reactor; hydrotreating the hydrocarbon stream in the presence of a hydrogen stream and pretreating catalyst to provide a pretreated effluent stream. The pretreated effluent stream is separated into a vaporous pretreated stream and a liquid pretreated stream and the liquid pretreated stream is hydrocracked in the presence of hydrocracking catalyst and hydrogen to provide a hydrocracking effluent stream. The vaporous pretreated stream is mixed with the hydrocracking effluent stream to provide a mixed hydrocracking effluent stream. At least a portion of the mixed hydrocracking effluent stream is fractionated to provide a diesel stream which is hydrotreated in the presence of a hydrotreating hydrogen stream and hydrotreating catalyst to provide a hydrotreating effluent stream.

An apparatus embodiment of the invention is an apparatus for producing diesel from a hydrocarbon stream may comprise a pretreat hydrotreating reactor and a pretreat separator for separating a pretreated effluent stream into a vaporous pretreated stream and a liquid pretreated stream. A pretreat overhead line is in communication with the separator and a hydrocracking zone is in communication with the pretreat separator for providing a hydrocracking effluent stream. A hydrocracking effluent line is in communication with the hydrocracking zone and the vaporous pretreated effluent line.

BRIEF DESCRIPTION OF THE DRAWING

The FIGURE is a simplified process flow diagram of an embodiment of the present invention.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "liquid communication" means that liquid continuously flows from the upstream component to the downstream component.

The term "vapor communication" means that vapor continuously flows from the upstream component to the downstream component.

The term "predominant" means at least 50 wt-% and preferably at least 70 wt-%.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of the reflux or reboil to the column.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "total conversion" means conversion of feed material boiling above the diesel boiling range in a hydrocracking unit and a subsequent hydrotreating unit to product material that boils at or below the diesel boiling range. Otherwise, as used herein, the term "conversion" means conversion of feed material boiling above the diesel boiling range in a single unit to product material that boils at or below the diesel boiling range. The cut point of the diesel boiling range is between about 343° and about 399° C. (650° to 750° F.) using the True Boiling Point distillation method.

As used herein, the term "diesel boiling range" means hydrocarbons boiling in the range of between about 132° and about 399° C. (270° to 750° F.) using the True Boiling Point distillation method.

As used herein, the terms "distillate" and "diesel" can be used interchangeably.

DETAILED DESCRIPTION

Turning to the FIGURE, a process and apparatus 8 for producing diesel comprises a hydrogen provision section 10, a hydrocracking unit 12, a hydrotreating unit 14 and a fractionation zone 16. Hydrocarbon feed is first fed to the hydrocracking unit 12 and converted to lower boiling hydrocarbons including diesel. The diesel is fractionated in a fractionation section therein and forwarded to the hydrotreating unit 14 to produce lower sulfur, higher cetane diesel.

A make-up hydrogen stream in a make-up hydrogen line 20 is fed to a train of one or more compressors 22 in the hydrogen provision section 10 to boost the pressure of the make-up hydrogen stream and provide a compressed make-up stream in line 26. The compressed make-up stream in compressed make-up hydrogen line 26 may join with a vaporous hydrocracking effluent stream comprising hydrogen in a compressed line 51 to provide a compressed hydrogen stream in line 28. The compressed make-up hydrogen stream may be added to the vaporous hydrocracking effluent stream downstream of a recycle gas compressor 50 at a location such that, relative to the compressed make-up hydrogen line 26, the recycle gas compressor 50 is upstream of any hydroprocessing reactor, such as a pretreating reactor 31, a hydrocracking reactor 36 or a hydrotreating reactor 92.

The compressed hydrogen stream in line 28 may be split between two hydrogen streams at a split 54. A first hydrocracking hydrogen stream may be taken from the introductory hydrogen stream in the compressed hydrogen line 28 at the split 54 in a first hydrogen split line 30. A second hydrotreating hydrogen stream may be taken from the compressed hydrogen stream in the compressed hydrogen line 28 at the split 54 in a second hydrogen split line 56. The first hydrogen line 30 may be in upstream communication with the hydrocracking reactor 36 and the pretreating reactor 31, and the second hydrogen stream in a second hydrogen split line 56 may be in upstream communication with the distillate hydrotreating reactor 92.

The first hydrocracking hydrogen stream in the first hydrogen split line 30 taken from the compressed hydrogen stream in line 28 may join a hydrocarbon feed stream perhaps through a surge tank in line 27 to provide a hydrocracking hydrocarbon feed stream in line 34.

The primary hydrocarbon feed stream is introduced in primary hydrocarbon feed line 32. In one aspect, the process described herein is particularly useful for hydroprocessing a hydrocarbonaceous feedstock. Applicable hydrocarbon feedstocks include hydrocarbonaceous streams having components having an initial boiling point suitably no less than about 150° C. (302° F.) and preferably no less than about 288° C. (550° F.), such as atmospheric gas oils, VGO, deasphalted, vacuum, and atmospheric residua, coker distillates, straight run distillates, solvent-deasphalted oils, pyrolysis-derived oils, high boiling synthetic oils, cycle oils, hydrocracked feeds, cat cracker distillates and the like. Suitable feeds may have an end point of no more than about (621° C.) 1150° F. These hydrocarbonaceous feed stocks may contain from about 0.1 to about 4 wt-% sulfur and 300 to 1800 wppm nitrogen. A suitable hydrocarbonaceous feedstock is a VGO or other hydrocarbon fraction having at least about 50 percent by weight, and usually at least about 75 percent by weight, of its components boiling at a temperature above about 399° C. (750° F.). A typical VGO normally has a boiling point range between about 315° C. (600° F.) and about 621° C. (1150° F.).

An aspect of the invention may be the provision of a separate hydrocarbon co-feed stream in addition to the primary hydrocarbon feed stream to the hydrocracking unit 12. The co-feed stream may be admixed with the primary hydrocarbon feed line 32 through a co-feed line 29. The co-feed stream may be a diesel stream. The hydrocarbon co-feed stream preferably has an initial boiling point between about 121° C. (250° F.) and about 288° C. (550° F.) and an end point of no more than about 399° C. (750° F.).

Hydrocracking refers to a process in which hydrocarbons crack in the presence of hydrogen to lower molecular weight hydrocarbons. A hydrocracking reactor 36 is in downstream communication with the one or more compressors 22 on the make-up hydrogen line 20, the co-feed line 29 and the hydrocarbon feed line 32. The hydrocracking hydrocarbon stream in line 34 comprising the mixed primary hydrocarbon feed stream and the hydrocarbon co-feed stream may be heated in a fired heater before entering the hydrocracking reactor 36 for hydrocracking the hydrocarbon stream to lower boiling hydrocarbons.

In an aspect of the present invention, the hydrocracking reactor 36 is preceded by a pretreat hydrotreating reactor 31 to remove nitrogen and sulfur species in the hydrocarbon feed stream. The hydrocracking hydrocarbon feed stream comprising preheated, primary hydrocarbon feed stream and the hydrocarbon co-feed stream in line 34 are fed to the pretreat hydrotreating reactor 31. In the pretreat hydrotreating reactor 31, the hydrocracking hydrocarbon stream is hydrotreated in the presence of the hydrocracking hydrogen stream and pretreat hydrotreating catalyst in one or more catalyst beds 33 to provide a pretreated effluent stream in pretreat effluent line 35. The pretreated effluent in pretreated effluent line 35 comprises hydrotreated primary hydrocarbon and co-feed products, both of which may comprise diesel and unconsumed hydrogen from the hydrocracking hydrogen stream. So as to avoid cracking the diesel product down to lighter products, the pretreated effluent is preferably transferred in line 35 to a pretreat separator 60 after having its temperature adjusted, preferably cooled, in a heat exchanger. Hydrogen streams may be injected between or after catalyst beds 33 to provide hydrogen requirements and/or to cool catalyst bed effluent.

The pretreat separator 60 is operated to separate diesel and lighter materials in a vaporous pretreated stream in a pretreat overhead line 63 from materials heavier than diesel in a liquid pretreated stream to be fed to the hydrocracking catalyst bed 37. The pretreat separator 60 operates at about 177° C. (350° F.) and preferably at about 232° C. (450° F.) to about 343° C. (650° F.) to assure that at least 80 wt-% and preferably at least 90 wt-% of the diesel material in the pretreated effluent stream in pretreat effluent line 35 ends up in the vaporous pretreated stream in the pretreat overhead line 63. The pretreat separator 60 may be operated at a slightly lower pressure than the pretreat hydrotreating reactor 31 accounting desirably only for pressure drop in line 35. The temperature in the pretreat separator 60 may be further reduced to achieve desired separation, but further pressure reduction may not be desired, in an aspect, so pressure is maintained for the hydrotreating section 14 without a need for further compression. A hydrocracking zone 62 is in liquid communication with the pretreat separator 60.

In the FIGURE, the hydrocracking reactor 36 comprises a single vessel that houses the pretreat separator 60 and the hydrocracking zone 62. Separation of the pretreated effluent stream in line 35 and hydrocracking of the liquid pretreated stream is performed in the same vessel, the hydrocracking reactor 36. Accordingly, pretreat effluent in line 35 is flashed in the pretreat separator 60 located in an upper end of the hydrocracking reactor 36. A deck 64 is interposed between the pretreat separator 60 and the hydrocracking zone 62. The deck 64 defines openings 66 surmounted by capped weirs 68. Liquid is maintained in a level on the deck 64 and capped weirs 68 in the deck 64 regulate the flow of the liquid pretreated stream through the openings 66 in the deck 64 to the hydrocracking zone 62 below the deck 64. A level indicator controller that measures the liquid level in the pretreat separator 60 may govern a control valve on the pretreat overhead line 63 to achieve a desired liquid level above the deck 64 in the pretreat separator 60. Reference to U.S. Pat. No. 7,803,334 B1 may be had for details regarding the hydrocracking reactor 36. It is contemplated that the pretreat separator may be in a vessel or vessels separate from the hydrocracking zone 62. The hydrocracking zone 62 is in downstream and liquid communication with the pretreat separator 60, but out of vapor communication with the pretreat separator 60. In an aspect, the hydrocracking zone 62 is vertically below the pretreat separator 60.

The hydrocracking reactor 36 may comprise one or more vessels, multiple beds of catalyst in each vessel, and various combinations of hydrotreating catalyst and hydrocracking catalyst in one or more vessels. In some aspects, the hydrocracking reaction provides total conversion of at least about 20 vol-% and typically greater than about 60 vol-% of the hydrocarbon feed to products boiling below the diesel cut point. The hydrocracking reactor 36 may operate at partial conversion of more than about 50 vol-% or full conversion of at least about 90 vol-% of the feed based on total conversion. To maximize diesel, full conversion is effective.

In the FIGURE, the hydrocracking reactor 36 comprises a hydrocracking zone 62 which is isolated from the pretreat separator 60 by the deck 64. In other words, gas in the pretreat separator that may contain ammonia and hydrogen sulfide does not enter the hydrocracking zone 62 because the liquid level on the deck 64 generated by capped weirs 68 prevents downward gas flow through the openings 66 into the hydrocracking zone 62. The hydrocracking reactor 36 may be operated at mild hydrocracking conditions. Mild hydrocracking conditions will provide about 20 to about 60 vol-%, preferably about 20 to about 50 vol-%, total conversion of the hydrocarbon feed to product boiling below the diesel cut point. In mild hydrocracking, converted products are biased in favor of diesel. In a mild hydrocracking operation, the hydrotreating catalyst may have just as much or a greater conversion role than hydrocracking catalyst. Conversion across the hydrotreating catalyst may be a significant portion of the overall, total conversion. If the hydrocracking reactor 36 is intended for mild hydrocracking, it is contemplated that the mild hydrocracking reactor 36 may be loaded with all hydrotreating catalyst, all hydrocracking catalyst, or some beds of hydrotreating catalyst and beds of hydrocracking catalyst. In the last case, the beds of hydrocracking catalyst may typically follow beds of hydrotreating catalyst. Most typically, from zero to two beds of hydrotreating catalyst may be followed by zero, one or two beds of hydrocracking catalyst in the hydrocracking zone 62.

The hydrocracking reactor 36 in the FIGURE may have two beds in one reactor vessel. If mild hydrocracking is desired, it is contemplated that the first catalyst bed 37 comprise hydrotreating catalyst and a subsequent catalyst bed 39 comprise hydrocracking catalyst. In an embodiment which utilized the pretreat hydrotreating reactor 31 it may be preferred that both beds 37 and 39 comprise hydrocracking catalyst. If partial or full hydrocracking is preferred, more beds of hydrocracking catalyst may be used in the hydrocracking reactor 36 than if mild hydrocracking is desired. One or more of the subsequent beds 39 in reactor 36 may contain hydrocracking catalyst.

A temperature-regulated, hydrocracking hydrogen stream in line 24 taken from the first hydrocracking hydrogen stream in first split line 30 may be injected upstream of the first catalyst bed 37 and downstream of the pretreat separator 60 to mix with the pretreated liquid stream to provide hydrogen requirements and regulate the feed temperature into the first bed 37. A hydrocracking hydrogen stream may also be injected between or after hydrocracking catalyst beds 37, 39 to provide hydrogen requirements and/or to cool hydrocracking effluent.

At mild hydrocracking conditions, the pretreated liquid stream is selectively converted to heavy products such as diesel and kerosene with a low yield of lighter hydrocarbons such as naphtha and gas. Pressure is also moderate to limit the hydrogenation of the bottoms product to an optimal level for downstream processing. The pretreated liquid stream is hydrocracked in the presence of hydrocracking catalyst and the hydrocracking hydrogen stream to provide a hydrocracking effluent stream in hydrocracking effluent line 38.

In one aspect, for example, when a balance of middle distillate and gasoline is preferred in the converted product, mild hydrocracking may be performed in the hydrocracking reactor 36 with hydrocracking catalysts that utilize amorphous silica-alumina bases or low-level zeolite bases combined with one or more Group VIII or Group VIB metal hydrogenating components. In another aspect, when middle distillate is significantly preferred in the converted product over gasoline production, partial or full hydrocracking may be performed in the hydrocracking reactor 36 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. One example of a zeolite falling in the preferred group is synthetic Y molecular sieve.

The naturally occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° to about 648° C. (about 700° to about 1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 435° C. (815° F.), a pressure from about 3.5 MPa (500 psig) to about 20.7 MPa (3000 psig), a liquid hourly space velocity (LHSV) from about 0.5 to less than about 5.0 hr$^{-1}$ and a hydrogen rate of about 421 Nm$^3$/m$^3$ oil (2,500 scf/bbl) to about 2,527 Nm$^3$/m$^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 5.0 hr$^{-1}$ and preferably about 0.7 to about 1.5 hr$^{-1}$ and a hydrogen rate of about 421 Nm$^3$/m$^3$ oil (2,500 scf/bbl) to about 1,685 Nm$^3$/m$^3$ oil (10,000 scf/bbl). A hydrocracking effluent exits the hydrocracking zone 62 and/or the hydrocracking reactor 36 in the hydrocracking effluent line 38 which is in downstream communication with the hydrocracking zone 62 and/or the hydrocracking reactor 36. The hydrocracking effluent line 38 is in downstream communication with the hydrocracking zone 62 and the pretreat overhead line 63. The hydrocracking effluent in line 38 is mixed with the vaporous pretreated stream in pretreat overhead line 63 that bypasses the hydrocracking reactor 36 and/or the hydrocracking catalyst beds 37, 39 in the hydrocracking zone 62 to provide a mixed hydrocracking effluent stream in line 69. In an aspect, the entire vaporous pretreated stream in pretreat overhead line 63 is mixed with the hydrocracking effluent stream in line 38. In a further aspect, the vaporous pretreated stream in pretreat overhead line 63 is mixed with the entire hydrocracking effluent stream in line 38. In an additional aspect, the entire vaporous pretreated stream in pretreat overhead line 63 is mixed with the entire hydrocracking effluent stream in vaporous pretreat line 38.

The mixed hydrocracking effluent stream in line 69, or at least a portion of the mixed hydrocracking effluent stream in line 69, may be fractionated in a fractionation section 16 in downstream communication with the hydrocracking reactor 36 and the pretreat hydrotreating reactor 31 to produce a diesel stream in line 86.

The mixed hydrocracking effluent stream in line 69 may be cooled before entering a hot separator 120. The hot separator 120 in the fractionation section 16 is in downstream communication with pretreat hydrotreating reactor 31, the pretreat overhead line 63, the hydrocracking reactor 36 and the hydrocracking effluent line 38. Fractionation of the mixed hydrocracking effluent stream includes separating the mixed hydrocracking effluent stream into a vaporous mixed hydrocracking effluent stream comprising hydrogen in a hot separator overhead line 122 and a liquid mixed hydrocracking effluent stream in a hot separator bottoms line 124 in the hot separator 120. The hot separator 120 operates at about 177° C. (350° F.) to about 343° C. (650° F.) and preferably operates at about 232° C. (450° F.) to about 288° C. (550° F.). The hot separator may be operated at a slightly lower pressure than the hydrocracking reactor 36 accounting for pressure drop. The vaporous mixed hydrocracking effluent stream in the hot separator overhead line 122 may be joined by a wash water stream in line 126 to wash out ammonium hydrosulfides and enter the cold separator 40.

The liquid mixed hydrocracking effluent stream in bottoms line 124 may be fractionated in the fractionation section 16. In an aspect, the liquid mixed hydrocracking effluent stream in line 124 may be flashed in a hot flash drum 130 to provide a vaporous intermediate mixed hydrocracking effluent stream in a hot flash overhead line 132 and a heavy liquid mixed hydrocracking effluent stream in a hot flash bottoms line 134. The hot flash drum 130 may be operated at the same temperature as the hot separator 120 but at a lower pressure of between about 1.4 MPa (gauge) (200 psig) and about 3.1 MPa (gauge) (450 psig). The heavy liquid mixed hydrocracking effluent stream in bottoms line 134 may be further fractionated in the fractionation section 16.

The cold separator 40 is in downstream communication with the hydrocracking reactor 36, the hydrocracking effluent line 38, the pretreat hydrotreating reactor 31 and the pretreat overhead line 63. The cold separator may be operated at about 15° C. (60° F.), preferably about 46° C. (115° F.), to about 63° C. (145° F.) and just below the pressure of the hydrocracking reactor 36 accounting for pressure drop in the lines therebetween to keep hydrogen and light gases such as hydrogen sulfide and ammonia in the overhead and normally liquid hydrocarbons in the bottoms. The cold separator 40 is operated at a temperature below the temperature at which the hot separator 120 is operated. The cold separator 40 is in downstream communication with the hot separator overhead line 122. Fractionation of the mixed hydrocracking effluent stream includes separating the vaporous mixed hydrocracking effluent stream from the hot separator overhead line 122 in the cold separator 40 to provide a vaporous light mixed hydrocracking effluent stream comprising hydrogen in a cold separator overhead line 42 and a liquid intermediate mixed hydrocracking effluent stream in a cold separator bottoms line 44. The cold separator also has a boot for collecting an aqueous phase in line 46. The vaporous light mixed hydrocracking effluent stream in line 42, which may be a portion of the liquid mixed hydrocracking effluent stream in the hot separator overhead line 122, may be mixed with a vaporous hydrotreating effluent stream from a hydrotreating separator overhead line 98 as will be described hereinafter and transported together in a mixed vapor line 45. The mixed vapor stream in mixed vapor line 45 may be scrubbed with an absorbent solution which may comprise an amine in a scrubber 41 to remove ammonia and hydrogen sulfide as is conventional prior to recycle of the vaporous mixed hydrocracking effluent stream and perhaps the vaporous hydrotreating effluent stream mixed therewith comprising hydrogen to the recycle gas compressor 50.

In an aspect, the liquid intermediate mixed hydrocracking effluent stream in cold separator bottoms line 44 may be fractionated in the fractionation section 16. In a further aspect, the fractionation section 16 may include a cold flash drum 160. The liquid intermediate mixed hydrocracking effluent stream in the cold separator bottoms line 44 may be flashed in the cold flash drum 160 which may be operated at the same temperature as the cold separator 40 but at a lower pressure of between about 1.4 MPa (200 psig) and about 3.1 MPa (gauge) (450 psig) to provide a liquid light mixed hydrocracking effluent stream in a cold flash bottoms line 164 from the and a light ends stream in a cold flash overhead line 162. In an aspect, the vaporous intermediate mixed hydrocracking effluent stream in the hot flash overhead line 132 may join the liquid intermediate mixed hydrocracking effluent stream in the cold separator bottoms line 44 and be flashed in the cold flash drum 160 together. The aqueous stream in line 46 from the boot of the cold separator may directed to the cold flash drum 160. A flash aqueous stream comprising sour water is removed from a boot in the cold flash drum 160 in line 166. The liquid light mixed hydrocracking effluent stream comprising liquid hydrocracking effluent in bottoms line 164 may be further fractionated in the fractionation section 16.

The liquid light mixed hydrocracking effluent stream in bottoms line 164 from the cold flash drum 160 and the liquid heavy mixed hydrocracking effluent stream in the hot flash bottoms line 134 from the hot flash drum 130 comprising liquid hydrocracking effluent may be further fractionated in the fractionation section 16.

The fractionation section 16 may include a stripping column 70 and a fractionation column 80. The liquid light mixed hydrocracking effluent stream in the cold flash bottoms line 164 may be heated and fed to the stripping column 70 which is in downstream communication with the hydrocracking effluent line 38 and the mixed hydrocracking effluent line 69. The liquid heavy mixed hydrocracking effluent stream in the hot flash bottoms line 134 comprising liquid hydrocracking effluent may be fed to the stripping column 70 without heating. The light liquid hydrocracking stream in line 164 may be fed to the stripping column 70 at an inlet that is at a higher location than an inlet for the liquid heavy mixed hydrocracking effluent stream in line 134. The stripping column 70 strips the liquid mixed hydrocracking effluent stream to remove hydrogen sulfide and ammonia and to provide a stripped mixed hydrocracking effluent stream in a hydrocracking stripper bottoms line 76.

In an aspect, the stripping column 70 may comprise a dividing wall column with a hydrocracking stripping section 71 for the mixed hydrocracked stream that is isolated in the bottom of the column from a hydrotreating stripping section 73. The hydrocracking stripping section 71 is in downstream communication with the hydrocracking reactor 36 and the hydrocracking effluent line 38. The dividing wall 75 therefore extends to a bottom of the stripping column 70, but not all the way to or short of a top of the column 70. Accordingly, materials in sections 71 and 73 can communicate at the top of the column 70, but are isolated from communication with each other at the bottom of the column 70. The liquid light mixed hydrocracking effluent stream and the liquid heavy mixed hydrocracking effluent stream may be stripped with steam or other inert gas from line 72 to provide a light ends stream of hydrogen, hydrogen sulfide, steam and other gases in an overhead line 74. A portion of the light ends stream may be condensed and refluxed to the stripper column 70. The hydrocracking stripping section 71 of the stripping column 70 may be operated with a bottoms temperature between about 232° C. (450° F.) and about 288° C. (550° F.) and an overhead pressure of about 690 kPa (gauge) (100 psig) to about 1034 kPa (gauge) (150 psig).

A stripped mixed hydrocracking effluent stream in a stripped hydrocracking line 76 from the hydrocracking stripping section 71 may be heated and fed to the fractionation column 80 which is in downstream communication with the stripping column 70. The fractionation column 80 is in downstream communication with the hydrocracking effluent line 38. In an aspect, the stripped mixed hydrocracking effluent stream in line 76 may be preflashed in a preflash drum 81 so as to feed vaporous stripped effluent stream to the fractionation column 80 in line 83 at a higher location than liquid stripped effluent stream in line 85. The liquid stripped effluent stream in line 85 may be heated in a fired heater before entering the fractionation column 80.

The fractionation column 80 may also strip the stripped mixed hydrocracking effluent stream with steam or other inert gas from line 82 to provide an overhead naphtha stream in line 84, a diesel stream in line 86 from a side cut outlet 86a and an unconverted oil stream in line 88 which may be suitable for further processing, such as in an FCC unit. The overhead naphtha stream in line 84 may require further processing before blending in the gasoline pool. It will usually require catalytic reforming to improve the octane number. The reforming catalyst will often require the overhead naphtha to be further desulfurized in a naphtha hydrotreater prior to reforming.

The diesel stream in line 86 may be first stripped with stream or other inert gas in a side stripper 87 to return lighter materials back to the fractionation column 80. It is also contemplated but not shown that a further side cut be taken to provide a separate light diesel or kerosene stream taken above a heavy diesel stream taken in line 86. A portion of the overhead naphtha stream in line 84 may be condensed and refluxed to the fractionation column 80. The fractionation column 80 may be operated with a bottoms temperature between about 288° C. (550° F.), and about 385° C. (725° F.), preferably between about 315° C. (600° F.) and about 357° C. (675° F.) and at or near atmospheric pressure. A portion of the hydrocracked bottoms may be reboiled and returned to the fractionation column 80 instead of using steam stripping.

The diesel stream in diesel line 86 will include much of the diesel in the co-feed stream 29 and the primary feed stream 32 or produced in the pretreater 31 and which bypassed the hydrocracking zone 62 and the diesel produced in the hydrocracking zone 62. The diesel stream in line 86 may have an initial boiling point between about 121° C. (250° F.) and about 288° C. (550° F.) and an end point of no more than about 399° C. (750° F.).

Much of the ammonia and hydrogen sulfide is stripped from the hydrocracking effluent before it is fractionated into the diesel stream 86. The diesel stream in line 86 may have a sulfur concentration of no more than 200 wppm and/or a nitrogen concentration of no more than 100 wppm. The diesel stream in line 86 is reduced in sulfur content but may or may not meet a low sulfur diesel (LSD) specification which is less than 50 wppm sulfur, or an ULSD specification which is less than 10 wppm sulfur, or other specifications. Moreover, the diesel stream in diesel line 86 may be adequately reduced in sulfur concentration but have a low cetane rating. Saturation of aromatics in the diesel stream will increase its cetane value. Hence, the diesel stream may be further finished in the hydrotreating unit 14 to meet applicable specifications and/or increase its value.

The diesel stream in line 86 may be joined by the second hydrotreating hydrogen stream taken from the compressed hydrogen stream in the compressed hydrogen line 28 at the split 54 in the second hydrogen split line 56 to provide a hydrotreating feed stream 90. The hydrotreating feed stream 90 may be heated in a heat exchanger and further heated in a fired heater and directed to the distillate hydrotreating reactor 92 which may be considered a polishing reactor. Consequently, the hydrotreating reactor 92 is in downstream communication with the fractionation section 16, the stripping column 70, the fractionation column 80, the compressed hydrogen line 28, the pretreat hydrotreating reactor 31 and the hydrocracking reactor 36. In the hydrotreating reactor 92, the diesel stream is hydrotreated in the presence of the second hydrotreating hydrogen stream and hydrotreating catalyst to provide a hydrotreating effluent stream 94. In an aspect, all of the hydrotreating hydrogen stream is provided from the compressed hydrogen stream in line 28 via second hydrogen split line 56.

The distillate hydrotreating reactor 92 may comprise more than one vessel and multiple beds of catalyst comprising a hydrotreating catalyst. The hydrotreating reactor 92 in the FIGURE may have two beds in one reactor vessel. In the hydrotreating reactor, hydrocarbons with heteroatoms are further saturated, demetallized, desulfurized and/or denitrogenated. The hydrotreating reactor may contain an aromatics saturation catalyst such as noble metal catalyst, a desulfurization and/or denitrification catalyst and/or a hydrodewaxing and/or hydroisomerization catalyst. Hydrogen streams may be injected between or after catalyst beds in the hydrotreating reactor 92 to provide hydrogen requirements and/or to cool hydrotreated effluent.

If the hydrocracking reactor 36 is operated as a mild hydrocracking reactor, the hydrocracking reactor may operate to convert up to about 20-60 vol-% of feed boiling above diesel boiling range to product boiling in the diesel boiling range. Consequently, the distillate hydrotreating reactor 92 should have very low conversion and is primarily for desulfurization, aromatization or isomerization if integrated with a mild hydrocracking reactor 36 to meet fuel specifications such as to qualify for ULSD or boost its cetane rating.

Hydrotreating is a process wherein hydrogen gas is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. Pour point and cloud point of the hydrotreated product may also be reduced. Suitable hydrotreating catalysts for use in any of the hydrotreating catalyst beds of reactors 31, 36 and 92 of the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts. It is within the scope of the present invention that more than one type of hydrotreating catalyst be used in the same pretreat hydrotreating reactor 31, hydrocracking reactor 36 or distillate hydrotreating reactor 92 and the catalysts used in each reactor may be different. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Noble metal catalysts in Group VIII of the Periodic Table may be useful catalysts in the hydrotreating reactor 92, such as for isomerizing to reduce pour or cloud point and saturating aromatics. Suitable metals are those of the group including platinum, palladium, rhodium, ruthenium, osmium and iridium. A particularly preferred catalytic composite contains a platinum or palladium component. The Group VIII metal component may exist within the final composite as a compound such as an oxide, sulfide, halide, etc., or in an elemental state. Generally the amount of the noble metal component is small compared to the quantities of the other components combined therewith. Calculated on an elemental basis, the noble metal component generally comprises from about 0.1% to about 2.0 wt-% of the final composite.

If aromatic saturation is desired, the Group VIII noble metal may be supported on a support material which includes, for example, alumina, silica, silica-alumina and zirconia. A preferred aromatic saturation catalyst contains platinum on amorphous silica-alumina.

If isomerization is desired, any suitable isomerization catalyst may find application. The isomerization catalyst may comprise a Group VIII noble metal on a support. Suitable isomerization catalysts include acidic catalysts using chloride for maintaining the desired acidity. The isomerization catalyst may be amorphous, e.g., based upon amorphous alumina, or zeolitic. A zeolitic catalyst would still normally contain an amorphous binder.

Because the distillate hydrotreating reactor 92 is operated at pressure equivalent to the hydrocracking reactor 36, the distillate stream in diesel line 86 can be hydrotreated in the distillate hydrotreating reactor 92 to produce low sulfur diesel or ULSD. Additionally or alternatively, because most of the organosulfur and organonitrogen are removed from the diesel stream, noble metal saturation catalyst can be loaded in the distillate hydrotreating reactor 92 to saturate aromatics to produce higher cetane diesel. Furthermore, alternatively or additionally, noble metal isomerization catalyst can be loaded in the distillate hydrotreating reactor 92 to isomerize straight chain paraffins into branched paraffins to produce reduced-cloud point diesel. It is contemplated that all, some or any of desulfurization catalyst, aromatic saturation catalyst and isomerization catalyst be loaded into the hydrotreating reactor 92.

Preferred hydrotreating reaction conditions in pretreat hydrotreating reactor 31, hydrotreating reactor 92 and perhaps in hydrotreating catalyst bed 37 in hydrocracking reactor 36 include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 4.1 MPa (600 psig), preferably 6.2 MPa (900 psig) to about 13.1 MPa (1900 psig), a liquid hourly space velocity of the fresh hydrocarbonaceous feedstock from about 0.5 hr$^{-1}$ to about 4 hr$^{-1}$, preferably from about 1.5 to about 3.5 hr$^{-1}$, and a hydrogen rate of about 168 Nm$^3$/m$^3$ oil (1,000 scf/bbl) to about 1,011 Nm$^3$/m$^3$ oil (6,000 scf/bbl), preferably about 168 Nm$^3$/m$^3$ oil (1,000 scf/bbl) to about 674 Nm$^3$/m$^3$ oil (4,000 scf/bbl).

The hydrotreating effluent stream in a hydrotreating effluent line 94 may be cooled and separated in a hydrotreating separator 96 to provide a vaporous hydrotreating effluent stream comprising hydrogen in a hydrotreating separator overhead line 98 and a liquid hydrotreating effluent stream in a hydrotreating separator bottoms line 100. The hydrotreating separator 96 is in downstream communication with the hydrotreating effluent line 94.

The vaporous hydrotreating effluent stream comprising hydrogen may be mixed with the vaporous mixed hydrocracking effluent stream in the cold separator overhead line 42 to be scrubbed in scrubber 41 for recycle of the hydrogen. The cold separator overhead line 42 is in downstream communication with the hydrotreating separator overhead line 98. Consequently, recycle gas loops from both the hydrocracking unit 12 and the hydrotreating unit 14 share the same recycle gas compressor 50. The hydrotreating separator may be operated at about 15° C. (60° F.), preferably 46° C. (115° F.), to about 63° C. (145° F.) and just below the pressure of the hydrotreating reactor 92 accounting for pressure drop in the lines therebetween to keep hydrogen and light gases such as hydrogen sulfide and ammonia in the hydrotreating separator overhead line 98 and all other hydrocarbons which should be predominantly diesel in the hydrotreating separator bottoms line 100. The liquid hydrotreating effluent stream in line 100 may be stripped in a stripper vessel.

In a further aspect, the fractionation section 16 may include a hydrotreating flash drum 110 to remove light ends. The liquid hydrotreating effluent stream in hydrotreating separator bottoms line 100 may be fed to a hydrotreating flash drum 110 to produce a vaporous light ends stream in a hydrotreating flash overhead line 112 and a normally liquid hydrotreating effluent stream in a hydrotreating flash bottoms line 114. The hydrotreating flash drum 110 may be operated at the same temperature as the hydrotreating separator 96 but at a lower pressure of between about 1.4 MPa (200 psig) and about 3.1 MPa (gauge) (450 psig). A flash aqueous stream comprising sour water may be removed from a boot in the cold flash drum 110 in line 116. The normally liquid hydrotreating effluent stream in the hydrotreating flash bottoms line 114 may be further fractionated in the fractionation section 16.

The normally liquid hydrotreating effluent stream in hydrotreating flash drum bottoms line 114 may be heated and fed to a stripper column to be stripped with steam or other inert gas to provide a naphtha stream and a product diesel stream. In an embodiment, the stripper column may be the dividing wall stripper column 70 to which the liquid light mixed hydrocracking effluent stream and the liquid heavy mixed hydrocracking effluent stream was fed. In this embodiment, the normally liquid stream in line 114 is fed to the hydrotreating section 73 on the other side of the dividing wall 75 to be stripped with steam or another inert gas from line 118. The hydrotreating stripping section 73 is in downstream communication with the hydrotreating reactor 92 and the hydrotreating effluent line 94. In an aspect, a single stripping column 70 is in downstream communication with the hydrocracking effluent line 38 and the hydrotreating effluent line 94.

The naphtha stream is separated from the diesel in the normally liquid stream and is recovered in the stripper overhead line 74 along with naphtha fed from lines 164 and 134 to the hydrotreating stripping section 71. The normally liquid stream may be fed to the stripping column 70 at an inlet having an elevation that is higher than the inlet for line 134 but lower than the inlet for line 164.

A product diesel stream may be recovered in hydrotreating bottoms product line 150 comprising less than 50 wppm sulfur qualifying it as LSD and preferably less than 10 wppm sulfur qualifying it as ULSD and preferably constituting a high cetane diesel with a cetane rating of over 45 and preferably at or over 50. It is contemplated that the stripper column 70 may be operated as a fractionation column with a reboiler instead of with stripping steam.

A first embodiment of the invention is a process for producing diesel from a hydrocarbon stream comprising feeding a hydrocarbon stream to a hydrotreating reactor; hydrotreating the hydrocarbon stream in the presence of a hydrogen stream and pretreating catalyst to provide a pretreated effluent stream; separating the pretreated effluent stream into a vaporous pretreated stream and a liquid pretreated stream; hydrocracking the liquid pretreated stream in the presence of hydrocracking catalyst and hydrogen to provide a hydrocracking effluent stream; mixing the vaporous pretreated stream with the hydrocracking effluent stream to provide a mixed hydrocracking effluent stream; fractionating at least a portion of the mixed hydrocracking effluent stream to provide a diesel stream; and hydrotreating the diesel stream in the presence of a hydrotreating hydrogen stream and hydrotreating catalyst to provide a hydrotreating effluent stream. An embodiment of the invention is one, any or all of prior embodiments in this paragraph up through the first embodiment in this paragraph further comprising separating at least a portion of the mixed hydrocracking effluent stream into a vaporous mixed hydrocracking effluent stream comprising hydrogen and a liquid mixed hydrocracking effluent stream. An embodiment of the invention is one, any or all of prior embodiments in this paragraph up through the first embodiment in this paragraph wherein the hydrotreating reactor comprises a catalyst selected from a noble metal catalyst, a desulfurization catalyst, an isomerization catalyst and an aromatic saturation catalyst. An embodiment of the invention is one, any or all of prior embodiments in this paragraph up through the first embodiment in this paragraph wherein the entire vaporous pretreated stream is mixed with the hydrocracking effluent stream. An embodiment of the invention is one, any or all of prior embodiments in this paragraph up through the first embodiment in this paragraph wherein the vaporous pretreated stream is mixed with the entire hydrocracking effluent stream. An embodiment of the invention is one, any or all of prior embodiments in this paragraph up through the first embodiment in this paragraph wherein the hydrocarbon stream comprises a primary hydrocarbon stream and a co-feed hydrocarbon stream comprising diesel. An embodiment of the invention is one, any or all of prior embodiments in this paragraph up through the first embodiment in this paragraph wherein the primary hydrocarbon feed stream has an initial boiling point of no less than about 150° C. (302° F.) and an end point of no more than about (621° C.) 1150° F. An embodiment of the invention is one, any or all of prior embodiments in this paragraph up through the first embodiment in this paragraph further comprising stripping the liquid mixed hydrocracking effluent stream to remove hydrogen sulfide and ammonia to provide a stripped mixed hydrocracking effluent stream. An embodiment of the invention is one, any or all of prior embodiments in this paragraph up through the first embodiment in this paragraph further comprising fractionating the stripped mixed hydrocracking effluent stream to provide a naphtha stream, the diesel stream and an unconverted oil stream. An embodiment of the invention is one, any or all of prior embodiments in this paragraph up through the first embodiment in this paragraph further comprising separating the hydrotreating effluent stream in a separator into a vaporous hydrotreating effluent stream and a liquid hydrotreating effluent stream and stripping the liquid hydrotreating effluent stream in a stripper column. An embodiment of the invention is one, any or all of prior embodiments in this paragraph up through the first embodiment in this paragraph further comprising separating at least a portion of the mixed hydrocracking effluent stream into a vaporous mixed hydrocracking effluent stream comprising hydrogen and a liquid mixed hydrocracking effluent stream and mixing the vaporous hydrotreating effluent stream with at least a portion of the vaporous mixed hydrocracking effluent stream. An embodiment of the invention is one, any or all of prior embodiments in this paragraph up through the first embodiment in this paragraph further comprising separating at least a portion of the mixed hydrocracking effluent stream into a vaporous mixed hydrocracking effluent stream comprising hydrogen and a liquid mixed hydrocracking effluent stream, stripping at least a portion of the liquid mixed hydrocracking effluent stream in the stripper vessel to remove hydrogen sulfide and ammonia to provide a stripped mixed hydrocracking effluent stream. An embodiment of the invention is one, any or all of prior embodiments in this paragraph up through the first embodiment in this paragraph wherein the separation of the pretreated effluent stream and the hydrocracking of the liquid pretreated stream is performed in the same vessel.

A second embodiment of the invention is a process for producing diesel from a hydrocarbon stream comprising feeding a primary hydrocarbon stream and a co-feed hydrocarbon stream comprising diesel to a hydrotreating reactor; hydrotreating the primary hydrocarbon stream and the co-feed hydrocarbon stream in the presence of a hydrogen stream and pretreating catalyst to provide a pretreated effluent stream; separating the pretreated effluent stream into a vaporous pretreated stream and a liquid pretreated stream; hydrocracking the liquid pretreated stream in the presence of hydrocracking catalyst and hydrogen to provide a hydrocracking effluent stream; mixing the vaporous pretreated stream with the hydrocracking effluent stream; fractionating a mixed hydrocracking effluent stream to provide a diesel stream; and hydrotreating the diesel stream in the presence of a hydrotreating hydrogen stream and hydrotreating catalyst to provide a hydrotreating effluent stream. An embodiment of the invention is one, any or all of prior embodiments in this paragraph up through the second embodiment in this paragraph further comprising separating the mixed hydrocracking effluent stream into a vaporous mixed hydrocracking effluent stream comprising hydrogen and a liquid mixed hydrocracking effluent stream. An embodiment of the invention is one, any or all of prior embodiments in this paragraph up through the second embodiment in this paragraph wherein the entire vaporous pretreated stream is mixed with the entire hydrocracking effluent stream.

A third embodiment of the invention is a process for producing diesel from a hydrocarbon stream comprising feeding a hydrocarbon stream to a hydrotreating reactor; hydrotreating the hydrocarbon stream in the presence of a hydrogen stream and pretreating catalyst to provide a pretreated effluent stream; separating the pretreated effluent stream into a vaporous pretreated stream and a liquid pretreated stream; hydrocracking the liquid pretreated stream in the presence of hydrocracking catalyst and hydrogen to provide a hydrocracking effluent stream; mixing the vaporous pretreated stream with the hydrocracking effluent stream; separating a mixed hydrocracking effluent stream in a separator to provide a liquid mixed hydrocracking effluent stream; stripping the liquid mixed hydrocracking effluent stream in a stripping vessel to provide a stripped mixed hydrocracking effluent stream; fractionating the stripped mixed hydrocracking effluent stream to provide a diesel stream; and hydrotreating the diesel stream in the presence of a hydrotreating hydrogen stream and hydrotreating catalyst to provide a hydrotreating effluent stream; separating the hydrotreating effluent stream in a separator to provide a liquid hydrotreating effluent stream; and stripping the hydrotreating effluent stream in the stripping vessel to provide ultra low sulfur diesel. An embodiment of the invention is one, any or all of prior embodiments in this paragraph up through the third embodiment in this paragraph further comprising separating the mixed hydrocracking effluent stream into a vaporous mixed hydrocracking effluent stream comprising hydrogen and the liquid mixed hydrocracking effluent stream, separating the hydrotreating effluent stream into a vaporous hydrotreating effluent stream and the liquid hydrotreating effluent stream and mixing the vaporous hydrotreating effluent stream with the vaporous mixed hydrocracking effluent stream. An embodiment of the invention is one, any or all of prior embodiments in this paragraph up through the third embodiment in this paragraph wherein the separation of the pretreated effluent stream and the hydrocracking of the liquid pretreated stream is performed in the same vessel. An embodiment of the invention is one, any or all of prior embodiments in this paragraph up through the third embodiment in this paragraph wherein the entire vaporous pretreated stream is mixed with the entire hydrocracking effluent stream.

A fourth embodiment of the invention is an apparatus for producing diesel from a hydrocarbon stream comprising a pretreat hydrotreating reactor; a pretreat separator for separating a pretreated effluent stream into a vaporous pretreated stream and a liquid pretreated stream; a pretreat overhead line in communication with the separator; a hydrocracking zone in communication with the pretreat separator for providing a hydrocracking effluent stream; a hydrocracking effluent line in communication with the hydrocracking zone and the vaporous pretreated effluent line. An embodiment of the invention is one, any or all of prior embodiments in this paragraph up through the fourth embodiment in this paragraph further comprising a fractionation column in communication with the hydrocracking effluent line and a hydrotreating reactor in communication with the fractionation column. An embodiment of the invention is one, any or all of prior embodiments in this paragraph up through the fourth embodiment in this paragraph further comprising a stripper column in communication with the hydrocracking effluent line and the fractionation column is in communication with the stripping column. An embodiment of the invention is one, any or all of prior embodiments in this paragraph up through the fourth embodiment in this paragraph further comprising a stripping section in communication with a hydrotreating effluent line from the hydrotreating reactor. An embodiment of the invention is one, any or all of prior embodiments in this paragraph up through the fourth embodiment in this paragraph wherein a single stripping column is in communication with the hydrocracking effluent line and the hydrotreating effluent line. An embodiment of the invention is one, any or all of prior embodiments in this paragraph up through the fourth embodiment in this paragraph further comprising a separator in communication with the hydrocracking effluent line and the vaporous pretreat line. An embodiment of the invention is one, any or all of prior embodiments in this paragraph up through the fourth embodiment in this paragraph wherein the separator is a hot separator and further comprising a cold separator in communication with the vaporous pretreat line. An embodiment of the invention is one, any or all of prior embodiments in this paragraph up through the fourth embodiment in this paragraph wherein the cold separator is in communication with an overhead line of the hot separator. An embodiment of the invention is one, any or all of prior embodiments in this paragraph up through the fourth embodiment in this paragraph further comprising a fractionation column in communication with the hydrocracking effluent line and a hydrotreating reactor in communication with the fractionation column and an overhead line of the cold separator is in communication with an overhead line of a hydrotreating separator in communication with the hydrotreating effluent line. An embodiment of the invention is one, any or all of prior embodiments in this paragraph up through the fourth embodiment in this paragraph further comprising a single vessel comprising the pretreat separator and the hydrocracking zone.

A fifth embodiment of the invention is an apparatus for producing diesel from a hydrocarbon stream comprising a pretreat hydrotreating reactor; a pretreat separator for separating pretreated effluent into a vaporous pretreat stream and a liquid pretreat stream; a vaporous pretreat overhead line in communication with the separator; a hydrocracking zone in communication with the separator for providing a hydrocracking effluent; a hydrocracking effluent line in communication with the hydrocracking zone and the vaporous pretreat overhead line; and a hydrotreating reactor in communication with the hydrocracking effluent line. An embodiment of the invention is one, any or all of prior embodiments in this paragraph up through the fifth embodiment in this paragraph further comprising a fractionation column in communication with the hydrocracking effluent line and the hydrotreating reactor in communication with the fractionation column. An embodiment of the invention is one, any or all of prior embodiments in this paragraph up through the fifth embodiment in this paragraph further comprising a stripper column in communication with the hydrocracking effluent line and the fractionation column is in communication with the stripping column. An embodiment of the invention is one, any or all of prior embodiments in this paragraph up through the fifth embodiment in this paragraph further comprising a stripping section in communication with a hydrotreating effluent line from the hydrotreating reactor. An embodiment of the invention is one, any or all of prior embodiments in this paragraph up through the fifth embodiment in this paragraph wherein a single stripping column is in communication with the hydrocracking effluent line and the vaporous pretreated effluent line and the hydrotreating effluent line. An embodiment of the invention is one, any or all of prior embodiments in this paragraph up through the fifth embodiment in this paragraph further comprising a separator in communication with the hydrocracking effluent line and the vaporous pretreated effluent line. An embodiment of the invention is one, any or all of prior embodiments in this paragraph up through the fifth embodiment in this paragraph further comprising a fractionation column in communication with the hydrocracking effluent line and the hydrotreating reactor in communication with the fractionation column; the separator is a hot separator and further comprising a cold separator in communication with the vaporous pretreat overhead line and an overhead line of the cold separator is in communication with an overhead line of a hydrotreating separator in communication with the hydrotreating effluent line.

A sixth embodiment of the invention is an apparatus for producing diesel from a hydrocarbon stream comprising a pretreat hydrotreating reactor; a pretreat separator in a hydrocracking reactor vessel for separating pretreated effluent into a vaporous pretreated effluent stream and a liquid pretreated effluent stream; a vaporous pretreated overhead line in communication with the pretreat separator; a hydrocracking zone in the hydrocracking reactor vessel in communication with the pretreat separator for providing a hydrocracking effluent; a hydrocracking effluent line in communication with the hydrocracking zone and the vaporous pretreat overhead line. An embodiment of the invention is one, any or all of prior embodiments in this paragraph up through the sixth embodiment in this paragraph further comprising a fractionation column in communication with the hydrocracking effluent line and a hydrotreating reactor in communication with the fractionation column. An embodiment of the invention is one, any or all of prior embodiments in this paragraph up through the sixth embodiment in this paragraph further comprising a stripper column in communication with the hydrocracking effluent line and the fractionation column is in communication with the stripping column.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for producing diesel from a hydrocarbon stream comprising:
a pretreat hydrotreating reactor;
a pretreat separator for separating a pretreated effluent stream into a vaporous pretreated stream and a liquid pretreated stream, wherein said vaporous pretreated stream passes through a vaporous pretreated effluent line;
a hydrocracking zone in communication with said pretreat separator for providing a hydrocracking effluent stream;
a hydrocracking effluent line in communication with said hydrocracking zone and said vaporous pretreated effluent line, wherein said vaporous pretreated stream and said hydrocracking effluent stream are combined to form a mixed hydrocracking effluent stream.

2. The apparatus of claim 1 further comprising a fractionation column in communication with said hydrocracking effluent line and a hydrotreating reactor in communication with said fractionation column.

3. The apparatus of claim 2 further comprising a stripper column in communication with said hydrocracking effluent line and the fractionation column is in communication with said stripping column.

4. The apparatus of claim 3 further comprising a stripping section in communication with a hydrotreating effluent line from said hydrotreating reactor.

5. The apparatus of claim 4 wherein a single stripping column is in communication with said hydrocracking effluent line and the hydrotreating effluent line.

6. The apparatus of claim 1 further comprising a separator in communication with said hydrocracking effluent line and said vaporous pretreated effluent line.

7. The apparatus of claim 6 wherein the separator is a hot separator and further comprising a cold separator in communication with said vaporous pretreated effluent line.

8. The apparatus of claim 7 wherein the cold separator is in communication with an overhead line of said hot separator.

9. The apparatus of claim 7 further comprising a fractionation column in communication with said hydrocracking effluent line and a hydrotreating reactor in communication with said fractionation column and an overhead line of said cold separator is in communication with an overhead line of a hydrotreating separator in communication with said hydrotreating effluent line.

10. The apparatus of claim 1 further comprising a single vessel comprising said pretreat separator and the hydrocracking zone.

11. An apparatus for producing diesel from a hydrocarbon stream comprising:
a pretreat hydrotreating reactor;
a pretreat separator for separating pretreated effluent into a vaporous pretreat stream and a liquid pretreat stream, wherein said vaporous pretreat stream passes through a vaporous pretreat overhead line;
said vaporous pretreat overhead line being in communication with said pretreat separator;
a hydrocracking zone in communication with said pretreat separator for providing a hydro cracking effluent;
a hydrocracking effluent line in communication with said hydrocracking zone and said vaporous pretreat overhead line, wherein said vaporous pretreat stream and said hydrocracking effluent both pass through a mixed hydrocracking effluent line;
a hydrotreating reactor in communication with said hydrocracking effluent line;
a separator in downstream communication with said mixed hydrocracking effluent line.

12. The apparatus of claim 11 further comprising a fractionation column in communication with said mixed hydrocracking effluent line and said hydrotreating reactor in communication with said fractionation column.

13. The apparatus of claim 12 further comprising a stripper column in communication with said mixed hydrocracking effluent line and said fractionation column is in communication with said stripping column.

14. The apparatus of claim 13 further comprising a stripping section in communication with a hydrotreating effluent line from said hydrotreating reactor.

15. The apparatus of claim 14 wherein a single stripping column is in communication with said hydrocracking effluent line and said vaporous pretreat overhead line and the hydrotreating effluent line.

16. The apparatus of claim 11 further comprising a fractionation column in communication with said mixed hydrocracking effluent line and said hydrotreating reactor in communication with said fractionation column; the separator is a hot separator and further comprising a cold separator in communication with said vaporous pretreat overhead line and an overhead line of said cold separator is in communication with an overhead line of a hydrotreating separator in communication with said hydrotreating effluent line.

17. An apparatus for producing diesel from a hydrocarbon stream comprising:

a pretreat hydrotreating reactor;
a pretreat separator in a hydrocracking reactor vessel for separating pretreated effluent into a vaporous pretreated effluent stream and a liquid pretreated effluent stream;
a vaporous pretreated overhead line in communication with said pretreat separator;
a hydrocracking zone in said hydrocracking reactor vessel in communication with said pretreat separator for providing a hydrocracking effluent;
a hydrocracking effluent line in communication with said hydrocracking zone and said vaporous pretreated overhead line, wherein said vaporous pretreated effluent stream and said hydrocracking effluent are combined within a mixed hydrocracking effluent line.

18. The apparatus of claim 17 further comprising a fractionation column in communication with said mixed hydrocracking effluent line and a hydrotreating reactor in communication with said fractionation column.

19. The apparatus of claim 18 further comprising a stripper column in communication with said mixed hydrocracking effluent line and the fractionation column is in communication with said stripping column.

\* \* \* \* \*